Aug. 11, 1964
W. G. NOBLE
3,144,226
SELF-LOCKING SWITCH MOTOR
Filed Feb. 6, 1959
2 Sheets-Sheet 1
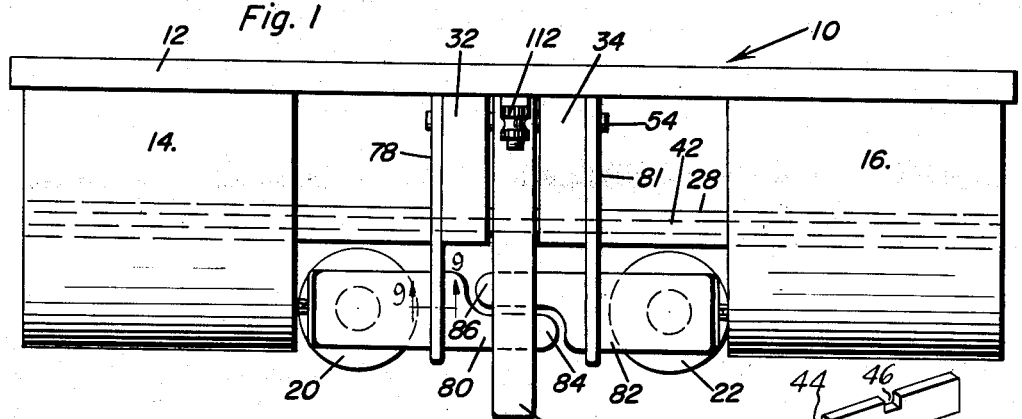
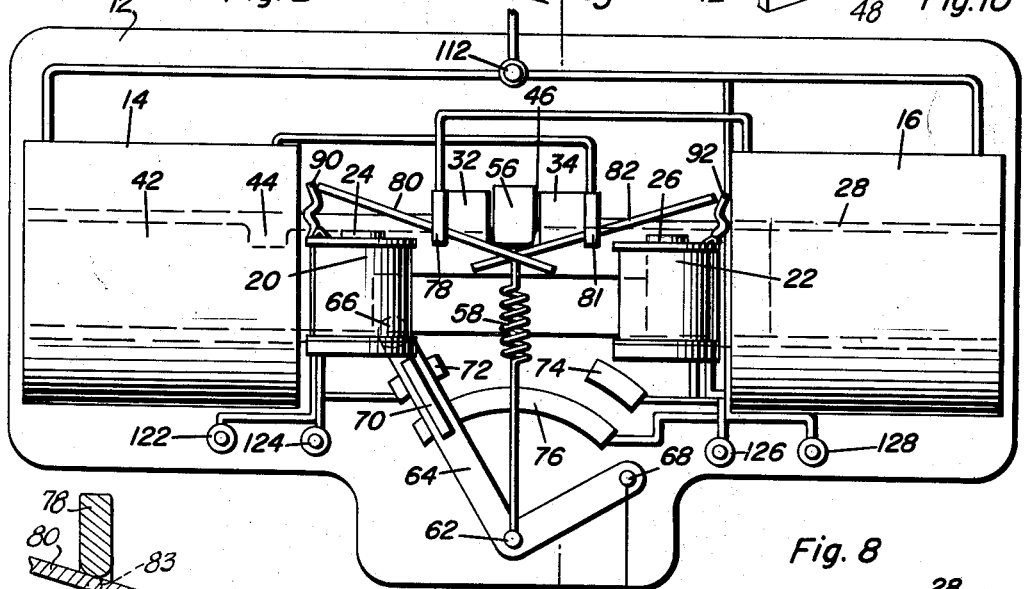
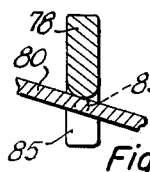
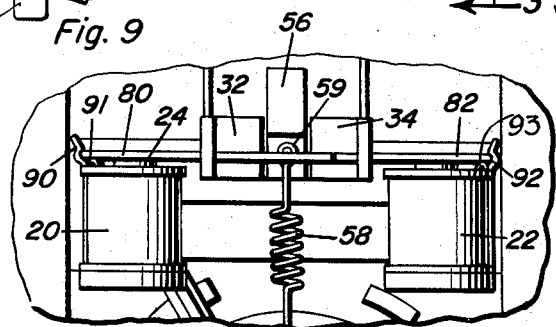
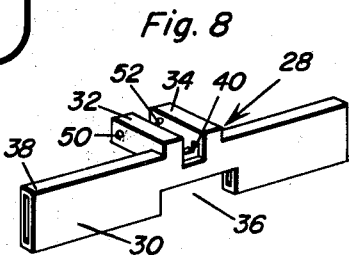
William G. Noble
INVENTOR.
BY Clarence A. O'Brien
and Harvey B. Jacobson
Attorneys Aug. 11, 1964 W. G. NOBLE 3,144,226
SELF-LOCKING SWITCH MOTOR
Filed Feb. 6, 1959 2 Sheets-Sheet 2
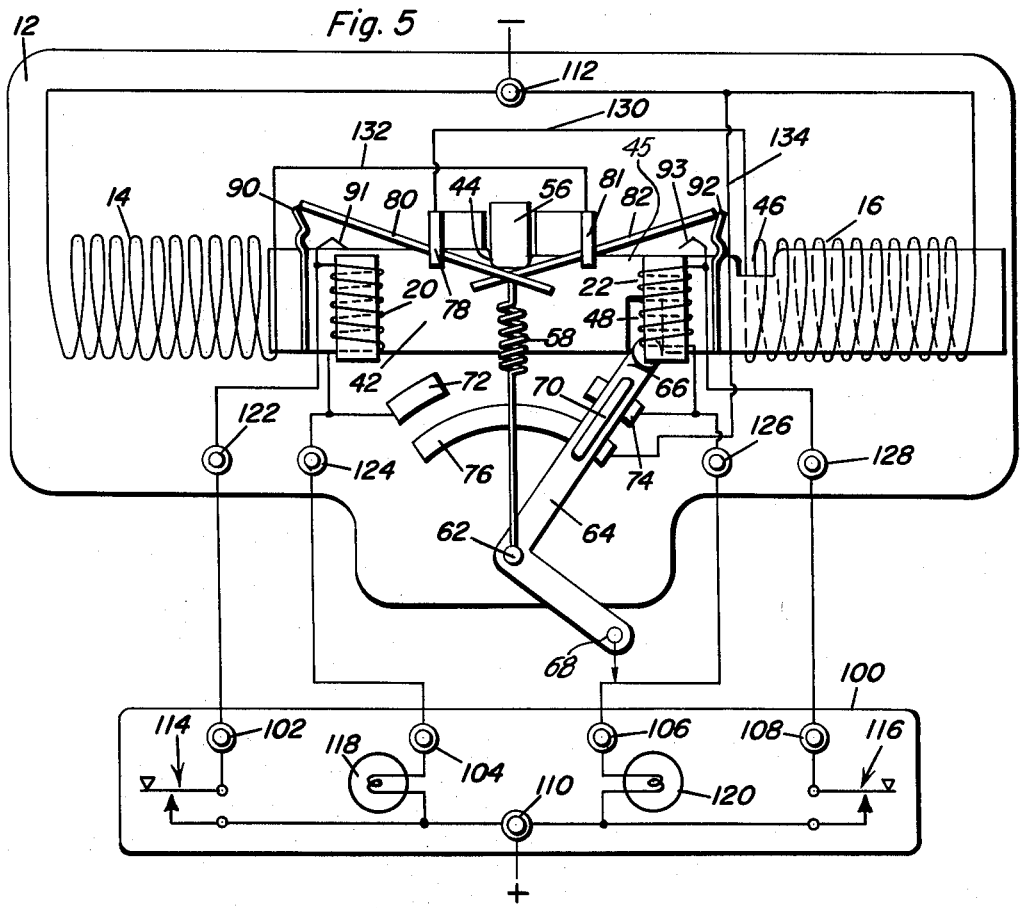
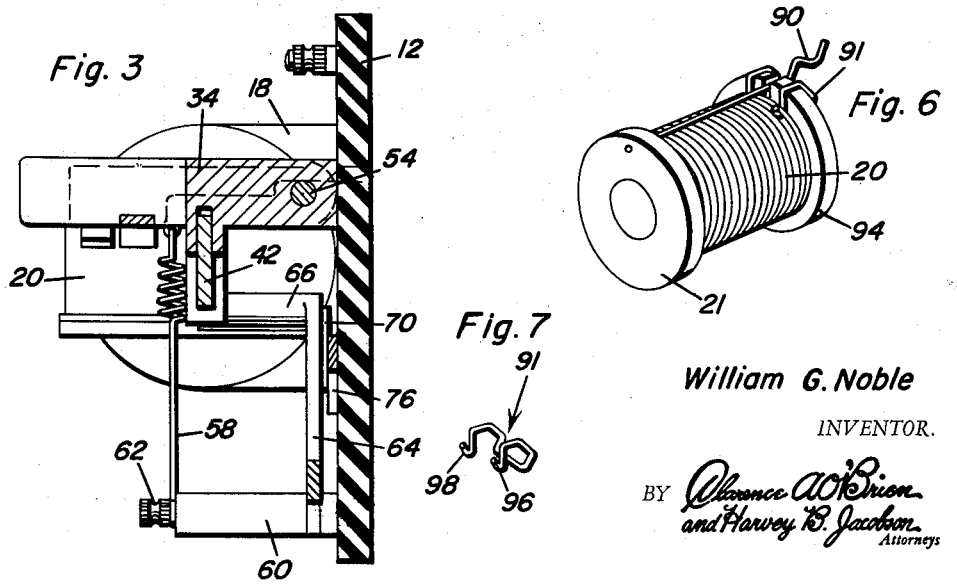
William G. Noble
INVENTOR.

United States Patent Office 3,144,226
Patented Aug. 11, 1964

3,144,226
SELF-LOCKING SWITCH MOTOR
William G. Noble, Larchmont, N.Y.
(44 Meadow Place, Rye, N.Y.)
Filed Feb. 6, 1959, Ser. No. 791,690
12 Claims. (Cl. 246—232)

This invention relates generally to switching systems and more particularly to a novel and improved self-locking switch motor which finds particular utility in railroad switching systems.

It is well known that various types of switching motors have been utilized in the railroad art for a long time. Many of the prior art devices utilize electromagnetic coils for providing the motive switching force to move the desired components. Further, the prior art reveals that locking means have been contemplated for use with such switches. This invention represents however an improved self-locking switch motor construction which utilizes electromagnetic means for pivoting a ratchet arm operatively connected to conventional switch blades. The invention particularly lies in the control means for operating the ratchet arm and in the positive self-locking means which provides greater safety and reliability. Accordingly, it is the principal object of this invention to provide a novel and improved construction in self-locking switch motors.

It is a further object of this invention to provide a novel and improved self-locking switch motor for operating conventional switch blades such that a train travelling over the switch cannot move the blades.

A further object of this invention is to provide a novel and improved construction in self-locking switch motors which utilizes a minimum of operating current for controlling and locking the switch blades.

It is a still further object of this invention to provide a novel and improved construction in self-locking switch motors which is relatively simple in construction and operation and accordingly inexpensive to manufacture and install.

In accordance with the above stated objects, particularly described hereafter is a novel construction and operation of a self-locking switch motor which includes an armature slidably supported within a guide mounted on a base. A pair of solenoid coils are positioned around the guide at either end of the slidable armature and are arranged so that upon selective energization of each of the solenoid coils, the energized solenoid coil will draw the slidable armature therein. The slidable armature includes a plurality of slots therein adapted to receive a spring urged locking bar. The locking bar is pivotally connected to the base and accordingly is transversely movable relative to the slidable movement of the armature for moving in and out of the slots in the armature. Apparently, when the locking bar is resiliently drawn into an armature slot, the armature is unable to move in response to energization of a solenoid coil. However, lock release means are provided which include a pair of pivotally mounted levers which are positioned to lift the locking bar from the slot for releasing the locking engagement between the locking bar and the slidable armature and also establish the energizing circuit for the solenoid drive coils. The pivotally mounted levers are selectively operated by selective energization of a pair of lock release coils. A ratchet arm which is operatively connected to the conventional switch blades is pivotally secured on the base with the ratchet arm having a projection extending into a cavity in the slidable armature. Accordingly, upon slidable movement of the armature, the ratchet arm is pivoted about its pivotal connection on the base for moving the switch blades. Position sensing circuit control means is also provided for sensing the position of the ratchet arm for timely deenergization of the lock release coils and changing of the drive solenoid circuit at the end of the arm stroke.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a rear view of the invention;
FIGURE 2 is a plan view of the invention;
FIGURE 3 is a sectional view taken substantially along the plane 3—3 of FIGURE 2;
FIGURE 4 is a fragmentary elevational view illustrating a lever in the pivoted position;
FIGURE 5 is a circuit diagram illustrating the electrical connections of the various electrical components of the invention;
FIGURE 6 is a perspective view of an auxiliary coil;
FIGURE 7 is a perspective view of a terminal adapted to be connected to a portion of the auxiliary coil;
FIGURE 8 is a perspective view of a guide to be utilized in conjunction with the sliding armature;
FIGURE 9 is a partial sectional view taken through a plane indicated by section line 9—9 in FIGURE 1; and
FIGURE 10 is a perspective view of the sliding armature.

With continuing reference to the drawing and initial reference to FIGURES 1 through 3, the numeral 10 generally represents the self-locking switch motor comprising this invention and including a base 12, preferably constructed of a flat insulative material.

Supported from the base are a pair of solenoid coils 14 and 16 for generating switch actuating forces and held by a bracket 18 as denoted in FIGURE 3. As will be appreciated from the figures, the solenoid coils 14 and 16 are longitudinally aligned but spaced. Also supported by the bracket 18 extending from base 12 are a pair of upstanding electromagnetic actuating coils 20 and 22 of a lock releasing mechanism having pole pieces 24 and 26.

A guide member 28 clearly illustrated in FIGURE 8, has a hollow body portion 30 and a pair of rearwardly projecting upstanding ears 32 and 34. An opening 36 is formed in the lower surface of the body portion 30 for purposes more specifically described hereafter. The top surface 38 of the body portion 30 is interruped between the ears 32 and 34 as shown at 40. The guide 28 is fixed to the base 12 by ears 32 and 34 in any suitable manner such as by gluing and the body portion 30 of the guide 28 thereby spaced from the base 12 slidably receives an armature 42 therein. The armature 42 has a pair of slots 44 and 46 on the upper surface thereof for positive switch locking purposes to be hereafter explained. It is to be noted that the upper duration control surface 45 between slots 44 and 46 is slightly below the upper surface outwardly of the slots. The lower surface of the slidable armature 42 has a slot portion 48 for non-yieldable transmission of switch actuating forces imposed on the armature 42. When the armature 42 is received within the guide 28 the top slots 44 and 46 are exposed in the opening 40 between the ears 32 and 34 of the guide 28. A slot 48 in the lower surface of the armature 42 is exposed through the opening 36 in the guide 28.

Aligned apertures 50 and 52 are placed in the ears 32 and 34 for accommodating a pin 54 upon which a locking bar 56 may pivot between the ears 32 and 34. A spring 58 is fixed to the locking bar 56 by ring 59 which is secured to the locking bar 56 by any of a number of well known means. The spring 58 is terminally secured to a projection 60 extending perpendicularly to the base 12. A nut 62 may be received on a reduced threaded portion of projection 60 for securing the spring 58 to the projection. It will be noted accordingly that the locking bar 56 is continually urged downwardly by the spring 58 retained at projection 60.

Pivoted on the projection 60 is a ratchet arm 64 having an L-shape and including a cylindrical projection 66 adapted to be received in slot 48 of armature 42. The arm 64 has an aperture at 68 by means of which it is adapted to be operatively connected to conventional switch blades (not shown) for operation thereof. The arm 64 further carries a position sensing shorting or bridging bar 70 for electrically bridging either of contacts 72 or 74 and slide bar 76. The shorting bar 70 represents a pole of a single pole double throw switch in effect because either the contact 72 or contact 74 may be electrically connected to the slide bar 76 and is operative as a release conditioning means as will be hereafter explained.

A pair of arms 78 and 81 are secured to the ears 32 and 34 of the guide 28 in non-conductive relation to each other. Each of the arms terminally and pivotally support lock releasing levers 80 and 82 in any suitable fashion as by pins 83 as seen by dotted line in FIGURE 9. As is well illustrated in FIGURE 1, the levers 80 and 82 constitute part of the lock releasing mechanism and include narrow portions 84 and 86 adapted to lie adjacent each other beneath the locking bar 56 so that the spring biased locking bar may pivotally displace and hold the locking levers in the position shown in FIGURES 2 and 5. Each of the levers 80 and 82 may rock within cavities 85 formed within the arms 78 and 81 as seen in FIGURE 9. It is to be noted that the levers 80 and 82 are constructed of a conductive material as compared to the supporting structure.

It is further to be noted that the levers 80 and 82 are positioned immediately above the pole pieces 24 and 26 of auxiliary coils 20 and 22 whereby upon energization of the auxiliary coils 20 and 22 the levers 80 and 82 will pivot with respect to arms 78 and 81. Particular attention is drawn to FIGURE 4 wherein the levers are illustrated in their pivoted position in contact with the pole pieces and retained by the latches 90 and 92. Latch 92 adjacent the auxiliary coil 22 is adapted to retain lever 82. Particular attention is drawn to the perspective view in FIGURE 6 wherein the details of the latch and auxiliary coil construction is illustrated. The coil 20 is preferably wound on a spool 21 and a conductive clip 91, clearly illustrated in FIGURE 7, fits over the spool flange 94 while depending legs 96 and 98 of the clip 91 form an electrical connection with a first turn of the coil 20. It is accordingly seen in FIGURE 4, that the lever 80 is in electrical contact with the terminal 91 and first turn of the coil 20.

The armature 42 is slidably received in the guide 28 and the body portion 30 of the guide 28 is positioned within the solenoid coils 14 and 16, the ears 32 and 34 of the guide 28 being secured to the base 12 as hereinbefore indicated. The locking bar 56 which is pivoted between the ears 32 and 34 is spring urged downwardly by spring 58 into the slots 44 and 46 when the slots are exposed through opening 40. The projection 66 on ratchet arm 64 is received within slot 48 in the opening 36 of guide 28. With these features in mind, the control circuit will be explained and the operation of the entire device set forth.

Particularly referring to FIGURE 5, a control box 100 is shown containing terminals 102, 104, 106, 108 and 110. The terminal 110 is intended to be electrically connected to one side of an electrical energy source. A terminal 112 positioned on the upper surface of the base 12 is intended to be electrically connected to the opposite side of the electrical energy source. Electrically connected between the terminals 102 and 108 are normally open selectively operable switches 114 and 116. For explanation purposes, the switches 114 and 116 are illustrated merely as single pole single throw switches but, however, it is within the contemplation of this invention that design refinements may dictate that the switches be spring urged open and have a time delay included therewith. Connected between the terminals 104 and 106 and the terminal 110 are indicator signal lights 118 and 120 for indicating the direction in which switch actuation is possible.

Terminals 102, 104, 106 and 108 of the control box 100 are electrically connected to terminals 122, 124, 126 and 128 on base 12. Serially connected between terminals 122 and 124 is the auxiliary coil 20 having the clip 91 for establishing an energizing circuit through lever 80 and coil 16 to terminal 112 and is effectively electrically connected to the first coil turn. The contact 72 is effectively electrically connected to terminal 124. The auxiliary coil 22 is serially connected between terminals 126 and 128 and has clip 93 for establishing an energizing circuit for coil 14 and is also electrically connected to the first turn thereof. Contact 74 is electrically connected to terminal 126. Conductive lever 80 being connected to arm 78 which is also made of conductive material, is electrically connected through arm 78 and wire 130 to solenoid coil 16 and thence to terminal 112. Conductive lever 82 is electrically connected through arm 81, wire 132 to solenoid coil 14 and thence to terminal 112. The shorting bar 70 carried by the arm 64 is constantly in contact with the slide bar 76 which in turn is electrically connected through wire 134 to terminal 112.

In the operation and utilization of this invention, we will initially consider the circuit as it appears in FIGURE 5. In this position, the indicator light 120 is lit as a complete electrical circuit exists from the electrical energy source to terminal 110, through indicator light 120, to contact 74, through bridging bar 70, through slide bar 76, to terminal 112 and back to the electrical energy source. With indicator light 120 lit, it indicates to the operator that switch 116 may be closed in order to change the position of the switch blades. When switch 116 is closed, auxiliary coil 22 is energized from terminal 110, through switch 116, through terminals 108 and 128, through the auxiliary coil 22, through contact 74, through bridging bar 70, through slide bar 76, through wire 134, to terminal 112 and back to the source. The energization of auxiliary coil 22 imposes a lock releasing force causing lever 82 to pivot about arm 81 and accordingly the portion 86 of lever 82 pivots locking bar 56 about pin 54 to remove the locking bar 56 from the slot 44 in armature 42. In order to control application of a switch actuating force by solenoid 14 lever 82 electrically contacts clip 93 in response to lock releasing displacement thereof to accordingly electrically connect the lever to the electrical source through terminals 128 and 110. The potential on lever 82 is of course impressed through wire 132 on solenoid 14 which is electrically connected to the other side of the source through terminal 112. Energization of solenoid coil 14 imposes the switch actuating force in one direction on armature 42 to the left for displacement thereof from the position indicated in FIGURE 5. As the armature 42 is drawn to the left, the slot 48 receiving projection 66 on ratchet arm 64 pivots the ratchet arm 64 about projection 60. In order to prevent premature deenergization of the solenoid 14 and control the duration of the actuating force, locking bar 56 rides on the top duration control surface 45 of the armature 42 as the armature 42 moves to the left to prevent displacement of the lever 82 through which the energizing circuit for the solenoid 14 is established. As the arm 64 is pivoted about the projection 60, the lock releasing mechanism is conditioned by bridging bar 70, breaking the connection between contact 74 and slide bar 76 to deenergize solenoid 22 and thereby interrupt the releasing force only after successful release of the armature as reflected by movement thereof. The spring 58 is then able to regain control of the lever 82 so that the locking bar 56 will be drawn into slot 46 of armature 42 when slot 46 passes between the ears 32 and 34 for exposure through 40. The spring 58 then pulls locking bar 56 into slot 46 and accordingly the movement of the armature 42 is halted without over-travel while at the same time lever 82 is pulled away from the latch 92 and coil contact clip 93 to thereby properly control the duration of the switch actuating force. Apparently then, the bridging bar 70 is then connecting the contact 72 and slide bar 76 and indicator light 118 is lit to reveal to the operator that switch releasing and actuating forces are available by closing of switch 114 for commencing a reverse sequence to return the armature 42 to the position shown in FIGURE 5.

It should now be apparent that the locking bar 56 in combination with the slots on the armature 42 provides positive locking so that the switch blades operated by the arm 64 are prevented from moving. It is to be noted that besides the positive locking afforded by the present invention, no operating current is utilized other than for the indicator lights 118 and 120. Of course, the circuit would function as well without the indicator lights 118 and 120. But, however, they are disclosed as a portion of the circuitry in that it has been found that they are significantly convenient.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A self-locking switch motor finding particular utility in railroad switching systems comprising a pair of spaced solenoid coils, an armature extending between said solenoid coils and slidably movable within said solenoid coils, said armature defining an upper surface having a pair of spaced upwardly opening slots therein, electrical energy means connected to said solenoid coils for selective energization thereof, a pivotally mounted locking bar, spring means urging said locking bar into engagement with said armature upper surface and into a slot when said slot moves into alignment with said bar, an arm operatively connected to said armature for movement in response to the sliding movement of said armature, and electromagnetic release means for selectively removing said locking bar from said slots whereby selective energization of said solenoid coils may then slidably move said armature.

2. The combination of claim 1 wherein said electromagnetic release means includes a pair of pivotally supported levers, an auxiliary coil mounted adjacent each of said levers for selectively pivoting said levers upon selective energization of said auxiliary coils, said levers extending proximate said bar whereby each of said levers may lift said bar from said slots against said spring means urging upon pivotal movement of said levers.

3. A self-locking switch for switching systems comprising an arm for controlling switch blades and electromechanical operating apparatus for moving said arm into one of two selective positions and locking said arm in said selected position, said apparatus including a pair of spaced solenoid coils, an armature extending between said solenoid coils and slidably movable within said solenoid coils, locking means including a pivotally mounted locking bar for engaging said armature to prevent slidable movement of said armature, releasing means for rendering said locking means ineffective to prevent said slidable movement of the armature, said releasing means including a pair of auxiliary coils and a pair of pivotally mounted conductive levers pivotable into engagement with said bar for displacement thereof out of locking engagement with the armature in response to the energization of said auxiliary coils.

4. A self-locking switch for switching systems comprising an arm for controlling switch blades and electromechanical operating apparatus for moving said arm into one of two selective positions and locking said arm in said selected position, said apparatus including a pair of spaced solenoid coils, an armature extending between said solenoid coils and slidably movable within said solenoid coils, locking means including a pivotally mounted locking bar for engaging said armture to prevent slidable movement of said armature, releasing means for rendering said locking means ineffective to prevent said slidable movement of the armature, said releasing means including a pair of auxiliary coils and a pair of pivotally mounted conductive levers pivotable into engagement with said bar for displacement thereof out of locking engagement with the armature in response to the energization of said auxiliary coils, a source of electrical energy, a pair of electric actuating switches, each of said switches serially connected to said source, each of said pair of auxiliary coils serially connected to one of said switches, and a single pole double throw switch interposed between said auxiliary coils and said source whereby said auxiliary coils may be selectively energized.

5. A self-locking switch for switching systems comprising an arm for controlling switch blades and electromechanical operating apparatus for moving said arm into one of two selective positions and locking said arm in said selected position, said apparatus including a pair of spaced solenoid coils, an armature extending between said solenoid coils and slidably movable within said solenoid coils, locking means including a pivotally mounted locking bar for engaging said armature to prevent slidable movement of said armature, releasing means for rendering said locking means ineffective to prevent said slidable movement of the armature, said releasing means including a pair of auxiliary coils and a pair of pivotally mounted conductive levers pivotable into engagement with said bar for displacement thereof out of locking engagement with the armature in response to the energization of said auxiliary coils, a source of electrical energy, a pair of electric actuating switches, each of said switches serially connected to said source, each of said pair of auxiliary coils serially connected to one of said switches, and a single pole double throw switch interposed between said auxiliary coils and said source whereby said auxiliary coils may be selectively energized, said pole of said single pole double throw switch operatively connected to said arm for movement therewith.

6. The combination of claim 5 wherein said single pole double throw switch includes a bridging bar carried by said arm, an arcuate slide bar, a pair of contacts, each of said contacts connected to one of said auxiliary coils, said slide bar connected to said source.

7. A self-locking switch for switching systems comprising an arm for controlling switch blades and electromechanical operating apparatus for moving said arm into one of two selective positions and locking said arm in said selected position, said apparatus including a pair of spaced solenoid coils, an armature extending between said solenoid coils and slidably movable within said solenoid coils, locking means including a pivotally mounted locking bar for engaging said armature to prevent slidable movement of said armature, releasing means for rendering said locking means ineffective to prevent said slidable movement of the armature, said releasing means including a pair of auxiliary coils and a pair of pivotally mounted conductive levers pivotable into engagement with said bar for displacement thereof out of locking engagement with the armature in response to the energization of said auxiliary coils, a source of electrical energy, a pair of electric actuating switches, each of said switches serially connected to said source, each of said pair of auxiliary coils serially connected to one of said switches, and a single pole double throw switch interposed between said auxiliary coils and said source whereby said auxiliary coils may be selectively energized, said pole of said single pole double throw switch operatively connected to said arm for movement therewith, each of said levers electrically serially connected to one of said pair of solenoid coils, conductive means on said auxiliary coils for applying a potential to a lever upon a pivotal movement of the lever in response to the energization of an auxiliary coil for energizing a solenoid coil.

8. A self-locking switch for switching systems comprising an arm for controlling switch blades and electromechanical operating apparatus for moving said arm into one of two selective positions and locking said arm in said selected position, said apparatus including a pair of spaced solenoid coils, an armature extending between said solenoid coils and slidably movable within said solenoid coils, locking means including a pivotally mounted locking bar for engaging said armature to prevent slidable movement of said armature, releasing means for rendering said locking means ineffective to prevent said slidable movement of the armature, said releasing means including a pair of auxiliary coils and a pair of pivotally mounted conductive levers pivotable into engagement with said bar for displacement thereof out of locking engagement with the armature in response to the energization of said auxiliary coils, a source of electrical energy, a pair of electric actuating switches, each of said switches serially connected to said source, each of said pair of auxiliary coils serially connected to one of said switches, and a single pole double throw switch interposed between said auxiliary coils and said source whereby said auxiliary coils may be selectively energized, said pole of said single pole double throw switch operatively connected to said arm for movement therewith, each of said levers electrically serially connected to one of said pair of solenoid coils, conductive means on said auxiliary coils for applying a potential to a lever upon a pivotal movement of the lever in response to the energization of an auxiliary coil for energizing a solenoid coil, said conductive means including terminals electrically connected to one side of each of said auxiliary coils, said conductive levers contacting said respective terminals upon pivotal movement in response to the energization of said auxiliary coils.

9. A self-locking switch for switching systems comprising an arm for controlling switch blades and electromechanical operating apparatus for moving said arm into one of two selective positions and locking said arm in said selected position, said apparatus including a pair of spaced solenoid coils, an armature extending between said solenoid coils and slidably movable within said solenoid coils, locking means including a pivotally mounted locking bar for engaging said armature to prevent slidable movement of said armature, releasing means for rendering said locking means ineffective to prevent said slidable movement of the armature, said releasing means including a pair of auxiliary coils and a pair of pivotally mounted conductive levers pivotable into engagement with said bar for displacement thereof out of locking engagement with the armature in response to the energization of said auxiliary coils, a source of electrical energy, a pair of electric actuating switches, each of said switches serially connected to said source, each of said pair of auxiliary coils serially connected to one of said switches, and a single pole double throw switch interposed between said auxiliary coils and said source whereby said auxiliary coils may be selectively energized, said pole of said single pole double throw switch operatively connected to said arm for movement therewith, each of said levers electrically serially connected to one of said pair of solenoid coils, conductive means on said auxiliary coils for applying a potential to a lever upon a pivotal movement of the lever in response to the energization of an auxiliary coil for energizing a solenoid coil, said conductive means including terminals electrically connected to one side of each of said auxiliary coils, said conductive levers contacting said respective terminals upon pivotal movement in response to the energization of said auxiliary coils, a latch positioned proximate each of said auxiliary coils for retaining said levers in said pivoted position.

10. A switch actuating mechanism for switching systems comprising, means rendered operative for generating switch actuating forces, movably mounted means operatively connected to said force generating means for directly transmitting said switch actuating forces to a switching system, positive lock means releasably engageable with said movably mounted means for limiting movement thereof between predetermined positions without over-travel, means for biasing said lock means into engagement with the movably mounted means, lock releasing means rendered operative independent of the movably mounted means to apply lock releasing forces to the lock means for withdrawal thereof from engagement with said movably mounted means at one of said predetermined positions, force control means operatively connected to the lock releasing means and the generating means effective to render the force generating means operative to apply switch actuating forces in response to complete withdrawal of the locked means from engagement with the movably mounted means, release conditioning means operatively connected to the lock releasing means and responsive to said withdrawal of the lock means and movement of the movably mounted means for rendering the lock releasing means inoperative thereby resetting said lock means for reengagement with the movably mounted means, duration control means operatively connected to the movably mounted means for engagement by the lock means to maintain the force control means effective and the force generating means operative until the movably mounted means arrives at one of said predetermined positions, and selectively operable means for rendering the lock releasing means operative prior to energization of the force generating means to initiate operation of the switch actuating mechanism, said lock releasing means comprising a pivotally mounted lever engageable with said lock means for disengagement thereof against the bias of said biasing means and magnetic actuating means operatively mounted relative to said lever for applying lock releasing forces thereto.

11. The combination of claim 10 including signal means operatively connected to the lock releasing means and movably mounted means for directionally indicating the availability of switch actuating forces prior to actuation of said selectively operable means.

12. The combination of claim 11, wherein said movably mounted means comprises armature means engageable with said lock means and operatively mounting said duration control means and rigid linkage means operatively connecting said armature means to said switching system and operatively mounting said release conditioning means.

References Cited in the file of this patent

UNITED STATES PATENTS

| | | | |
|---|---|---|---|
| 374,733 | Currie | Dec. 13, 1887 |
| 586,702 | Browne | July 20, 1897 |
| 651,112 | Gorn | June 5, 1900 |
| 863,238 | Thullen | Aug. 13, 1907 |
| 1,004,518 | Zinn | Sept. 26, 1911 |
| 1,631,648 | Robinson | June 7, 1927 |
| 1,917,837 | Haddlessay | July 11, 1933 |
| 2,079,251 | Haupt | May 4, 1937 |
| 2,202,546 | Bonanno | May 28, 1940 |
| 2,262,061 | Somers | Nov. 11, 1941 |
| 2,955,241 | Schleicher | Oct. 4, 1960 |

FOREIGN PATENTS

| | | |
|---|---|---|
| 619,216 | France | Dec. 28, 1926 |